(12) United States Patent
Lee et al.

(10) Patent No.: US 9,777,764 B2
(45) Date of Patent: Oct. 3, 2017

(54) TRANSMISSION SHAFT ASSEMBLY

(71) Applicants: Hsiao-Lin Lee, Taoyuan (TW); Chin-Chou Lin, Taoyuan (TW)

(72) Inventors: Hsiao-Lin Lee, Taoyuan (TW); Chin-Chou Lin, Taoyuan (TW)

(*) Notice: Subject to any disclaimer, the term of this patent is extended or adjusted under 35 U.S.C. 154(b) by 0 days.

(21) Appl. No.: 14/964,117

(22) Filed: Dec. 9, 2015

(65) Prior Publication Data

US 2017/0167527 A1    Jun. 15, 2017

(51) Int. Cl.
*F16C 3/02* (2006.01)
*F16D 1/068* (2006.01)

(52) U.S. Cl.
CPC .............. *F16C 3/026* (2013.01); *F16C 3/023* (2013.01); *F16D 1/068* (2013.01)

(58) Field of Classification Search
CPC .. F16C 3/023; F16C 3/026; F16D 1/06; F16D 1/064; F16D 1/068
USPC ................ 464/149, 153, 154, 157, 181–183
See application file for complete search history.

(56) References Cited

U.S. PATENT DOCUMENTS

| | | | | |
|---|---|---|---|---|
| 4,352,584 A | * | 10/1982 | Smith | C09J 5/00 403/13 |
| 4,358,284 A | * | 11/1982 | Federmann | B29C 70/86 138/109 |
| 4,663,819 A | * | 5/1987 | Traylor | F16C 3/026 29/432 |
| 4,792,320 A | * | 12/1988 | Nickel | F16C 3/026 464/181 |
| 4,853,060 A | * | 8/1989 | Nickel | F16C 3/026 156/172 |
| 4,930,204 A | * | 6/1990 | Schurter | B29C 37/0085 228/136 |
| 4,952,195 A | * | 8/1990 | Traylor | F16D 3/387 464/181 |
| 5,601,494 A | * | 2/1997 | Duggan | F16C 3/026 464/182 |
| 6,855,061 B2 | * | 2/2005 | Simboli | F16D 1/068 228/135 |
| 8,161,619 B2 | * | 4/2012 | Wanthal | B64C 1/06 29/460 |
| 8,664,791 B2 | * | 3/2014 | Rebsdorf | F03D 15/00 290/55 |

(Continued)

FOREIGN PATENT DOCUMENTS

| | | | | |
|---|---|---|---|---|
| DE | | 2851293 A1 * | 5/1979 | .............. F16C 3/026 |
| DE | 102011085962 A1 * | | 5/2013 | .............. B29C 70/52 |
| WO | WO 2005113990 A1 * | | 12/2005 | .............. F16B 11/00 |

*Primary Examiner* — Josh Skroupa
(74) *Attorney, Agent, or Firm* — Muncy, Geissler, Olds & Lowe, P.C.

(57) ABSTRACT

A transmission shaft assembly includes a carbon-fiber tube having two ends, and each end has protrusions and recesses which are located alternatively to the protrusions. Two connectors each have an outer tubular portion and an inner tubular portion extending axially therefrom. Multiple first engaging portions and multiple second engaging portions are located between the outer tubular portion and the inner tubular portion of each of the connectors. The two connectors are respectively connected to the two ends of the carbon-fiber tube. The first engaging portions are engaged with the recesses, and the second engaging portions are engaged with the protrusions. Adhesive is applied between the connectors and the carbon-fiber tube.

2 Claims, 7 Drawing Sheets

(56) References Cited

U.S. PATENT DOCUMENTS

2011/0209961 A1* 9/2011 Yamamoto .............. F16D 1/101
　　　　　　　　　　　　　　　　　　　　　　　192/3.28

* cited by examiner

TRANSMISSION SHAFT ASSEMBLY

BACKGROUND OF THE INVENTION

1. Fields of the Invention

The present invention relates to a transmission shaft assembly, and more particularly, to a light weight transmission shaft assembly for bearing high torque.

2. Descriptions of the Prior Art

The conventional transmission shaft assembly generally includes a tube and two connectors on two ends of the tube, wherein the tube and the connectors are made by metal which is heavy. The connectors are welded to the two ends of the tube so as to bear high torque. However, the higher torque the transmission shaft assembly outputs, the thicker the wall of the tube is required. Therefore, a tube made by carbon fibers is developed to make the tube of the transmission shaft assembly. Nevertheless, the metal-made connectors cannot be welded to the tube made by carbon fibers. Usually, the connectors are adhered to the two ends of the tube, but the connectors are easily separated from the tube due to high torque applied thereto. The adhesive used to connect the connectors to the tube may become fragile and can be broken at low temperature, such that the connectors shaft relative to the tube. A sleeve is used between the connectors and the tube to reinforce the connection. Alternatively, the tube is mounted to the connectors, and a sleeve is mounted to the connection area between the tube and the connector, the sleeve is adhered to the connector and the tube. Unfortunately, the sleeves are damaged when a high torque is applied. Besides, it is costly for the molds to install the sleeve to the specific position.

The present invention intends to provide a transmission shaft assembly to eliminate the shortcomings mentioned above.

SUMMARY OF THE INVENTION

The present invention relates to a transmission shaft assembly and comprises a carbon-fiber tube having a first end and a second end. The first end has first protrusions and first recesses which are located alternatively to the first protrusions. The second end has second protrusions and second recesses which are located alternatively to the second protrusions. Two connectors each have an outer tubular portion and an inner tubular portion extending axially therefrom. Multiple first engaging portions and multiple second engaging portions are located between the outer tubular portion and the inner tubular portion of each of the connectors. The first engaging portions are located alternatively to the second engaging portions. The connectors are connected to the first end and the second end of the carbon-fiber tube respectively. The first engaging portions of each of the two connectors are engaged with the first/second recesses, and the second engaging portions of each of the two connectors are engaged with the first/second protrusions. The inner tubular portion of each of the two connectors is inserted into the carbon-fiber tube and has connection grooves defined in the outer periphery thereof.

The primary object of the present invention is to provide a transmission shaft assembly which is light in weight and bears higher torque and has higher transmission efficiency.

Another object of the present invention is to provide a transmission shaft assembly which is easily assembled and reduces manufacturing cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the transmission shaft assembly 1 of the present invention comprises a carbon-fiber tube 2 which is an integral tube made by carbon-fiber compound material. The carbon-fiber tube 2 has a first end 21 and a second end 22, wherein the first end 21 has first protrusions 211 and first recesses 212 which are located alternatively to the first protrusions 211, and the second end 22 has second protrusions 221 and second recesses 222 which are located alternatively to the second protrusions 221. In this embodiment, the number of the first protrusions 211, the second protrusions 221, the first recesses 212 and the second recesses 222 is four. Of course, the number can be six of any proper number.

Two connectors 3 each are an integral metallic connector and are respectively connected to the first and second ends 21, 22 of the carbon-fiber tube 2. Each of the two connectors 3 has an outer tubular portion 31 and an inner tubular portion 32 extending axially therefrom. Multiple first engaging portions 33 and multiple second engaging portions 34 are located between the outer tubular portion 31 and the inner tubular portion 32 of each of the connectors 3. The number of each the first engaging portions 33 and multiple second engaging portions 34 is matched with the number of the first protrusions 211, the second protrusions 221, the first recesses 212 and the second recesses 222. The outer tubular portion 31 integrally formed with the first engaging portions 33, the second engaging portions 34 and the inner tubular portion 32. The first engaging portions 33 located alternatively to the second engaging portions 34. The first and second engaging portions 33, 34 are formed on the inner periphery of the outer tubular portion 31 and located lower than the distal edge of the outer tubular portion 31. The first engaging portions 33 are located between the inner end of each of the second engaging portions 34 and the distal edge of the outer tubular portion 31. The first engaging portions 33 of each of the two connectors 3 are engaged with the first/second recesses 212/222, and the second engaging portions 34 of each of the two connectors 3 are engaged with the first/second protrusions 211/221. The inner tubular portion 32 of each of the two connectors 3 is inserted into the carbon-fiber tube 2 and has connection grooves 321 defined transversely in the outer periphery thereof. It is noted the connection grooves 321 can also be orientated in different directions such as axial connection grooves. An adhesive 4 is located between the inner tubular portion 32 of each of the connectors 3 and the carbon-fiber tube 2. The first and second recesses 212, 222 are axially engaged with the first engaging portions 33, and the first and second protrusions 211, 221 are axially engaged with the second engaging portions 34. The adhesive 4 is applied between the first and second recesses 212, 222 and the first engaging portions 33, and the adhesive 4 is also applied between the first and second protrusions 211, 221 and the second engaging portions 34.

Figure 1:
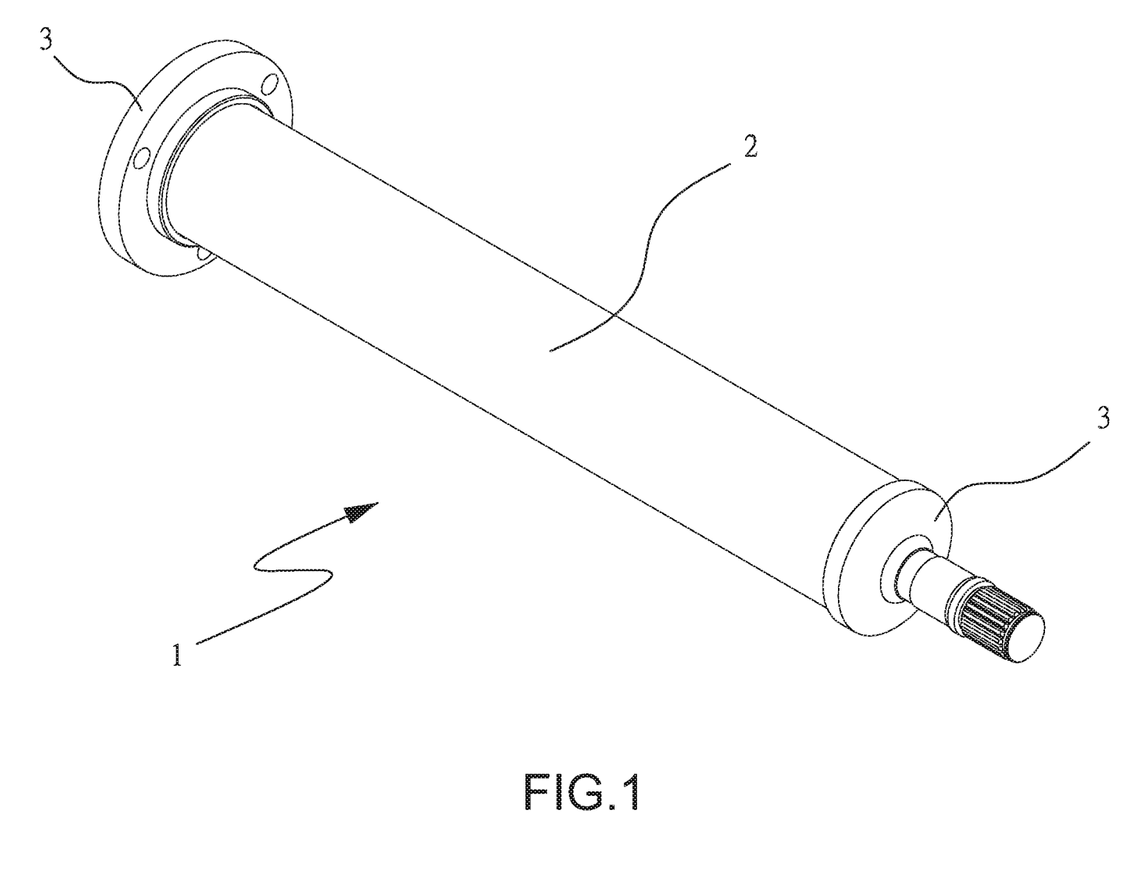
FIG. 1 is a perspective view to show the transmission shaft assembly of the present invention.
Figure 2:
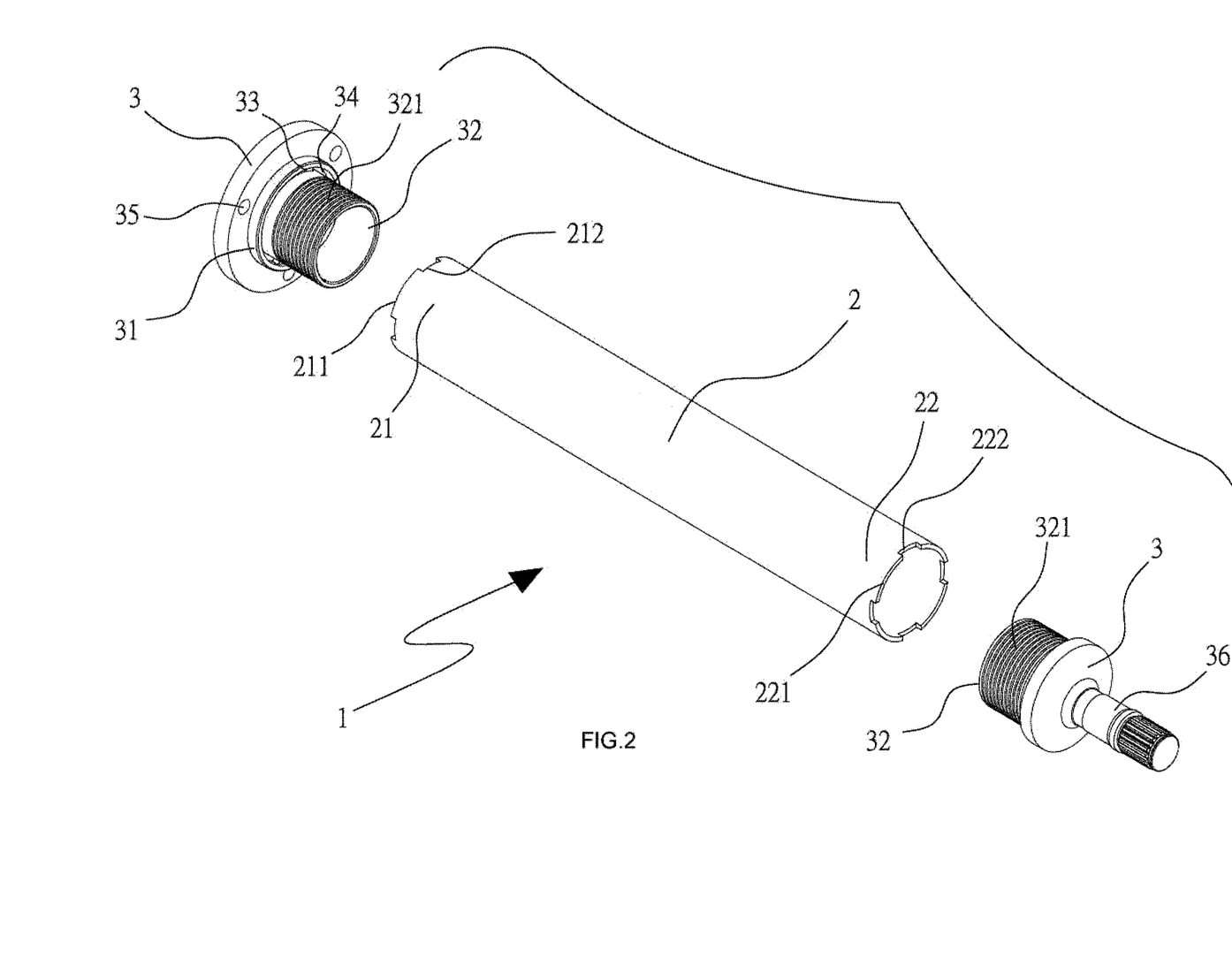
FIG. 2 is an exploded view of the transmission shaft assembly of the present invention.
Figure 3:
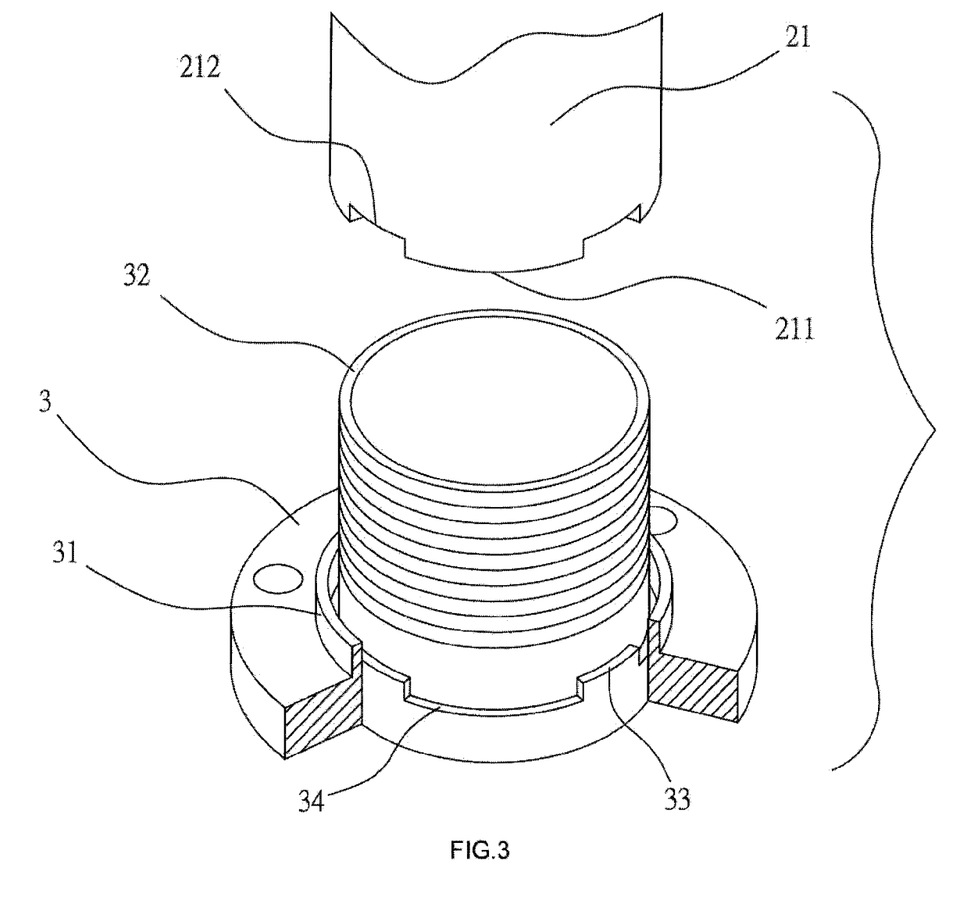
FIG. 3 shows one of the two connectors, partially removed for illustration purpose.
Figure 4:
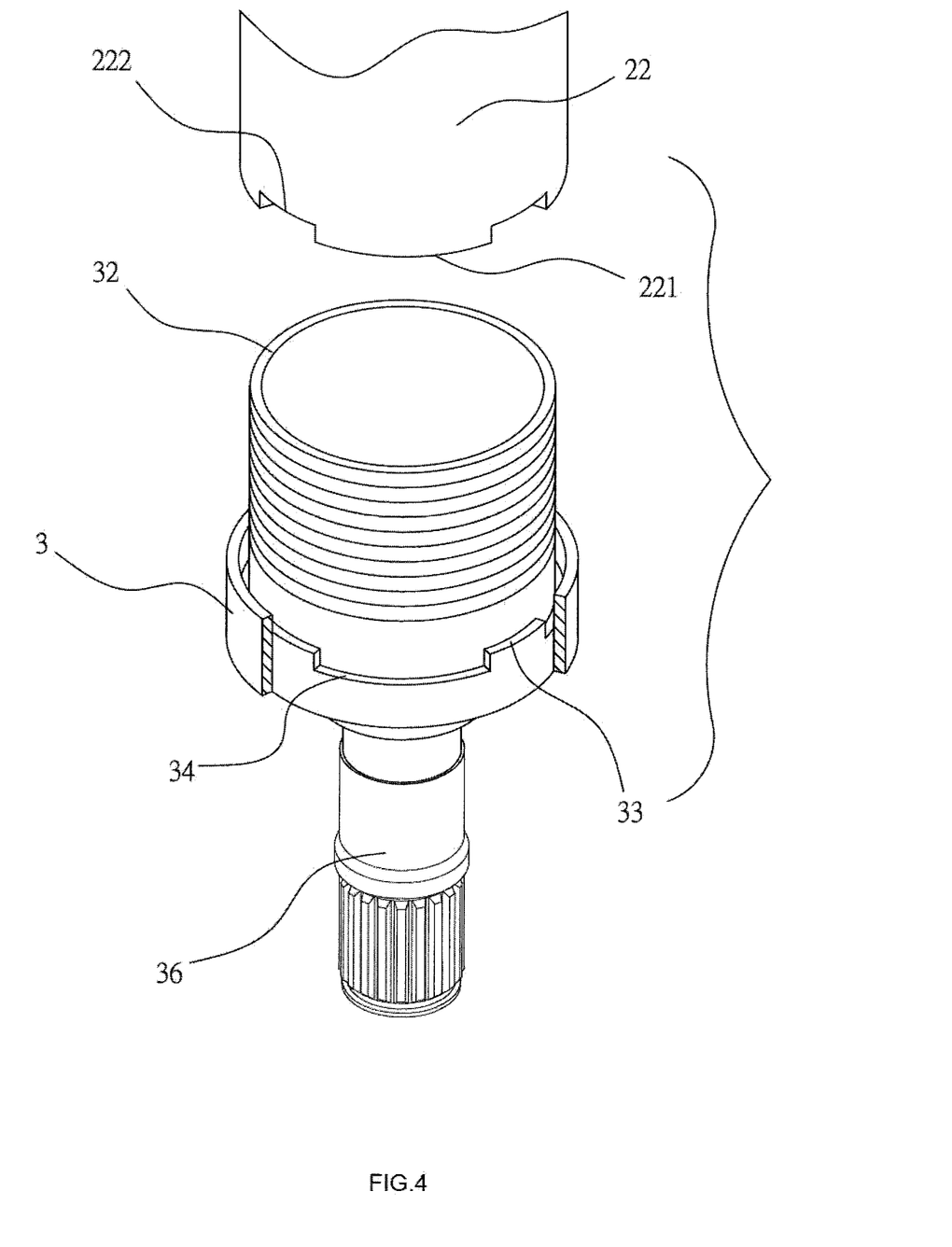
FIG. 4 shows the other one of the two connectors, partially removed for illustration purpose.
Figure 5:
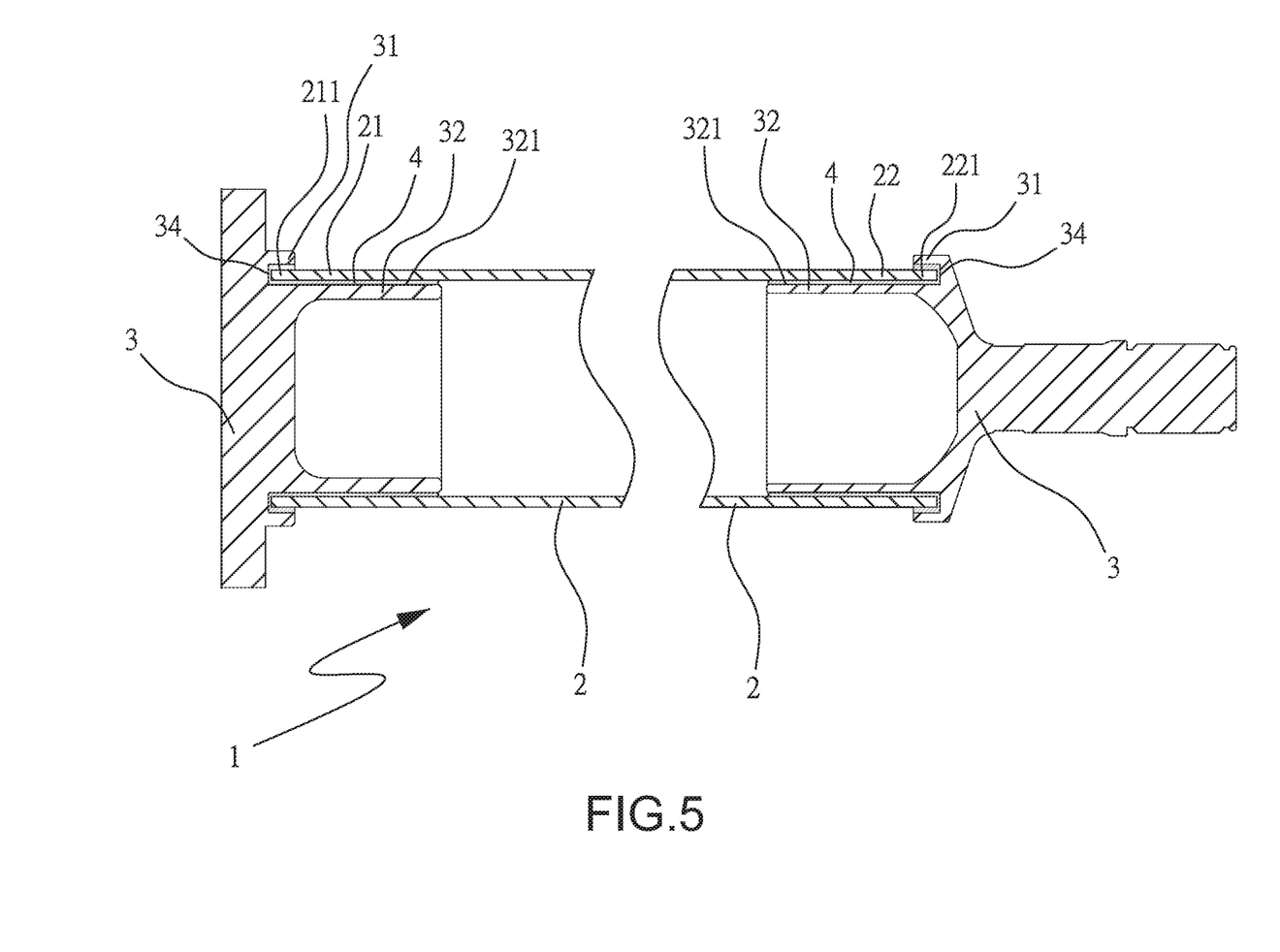
FIG. 5 is a cross sectional view of the transmission shaft assembly of the present invention.
Figure 6:
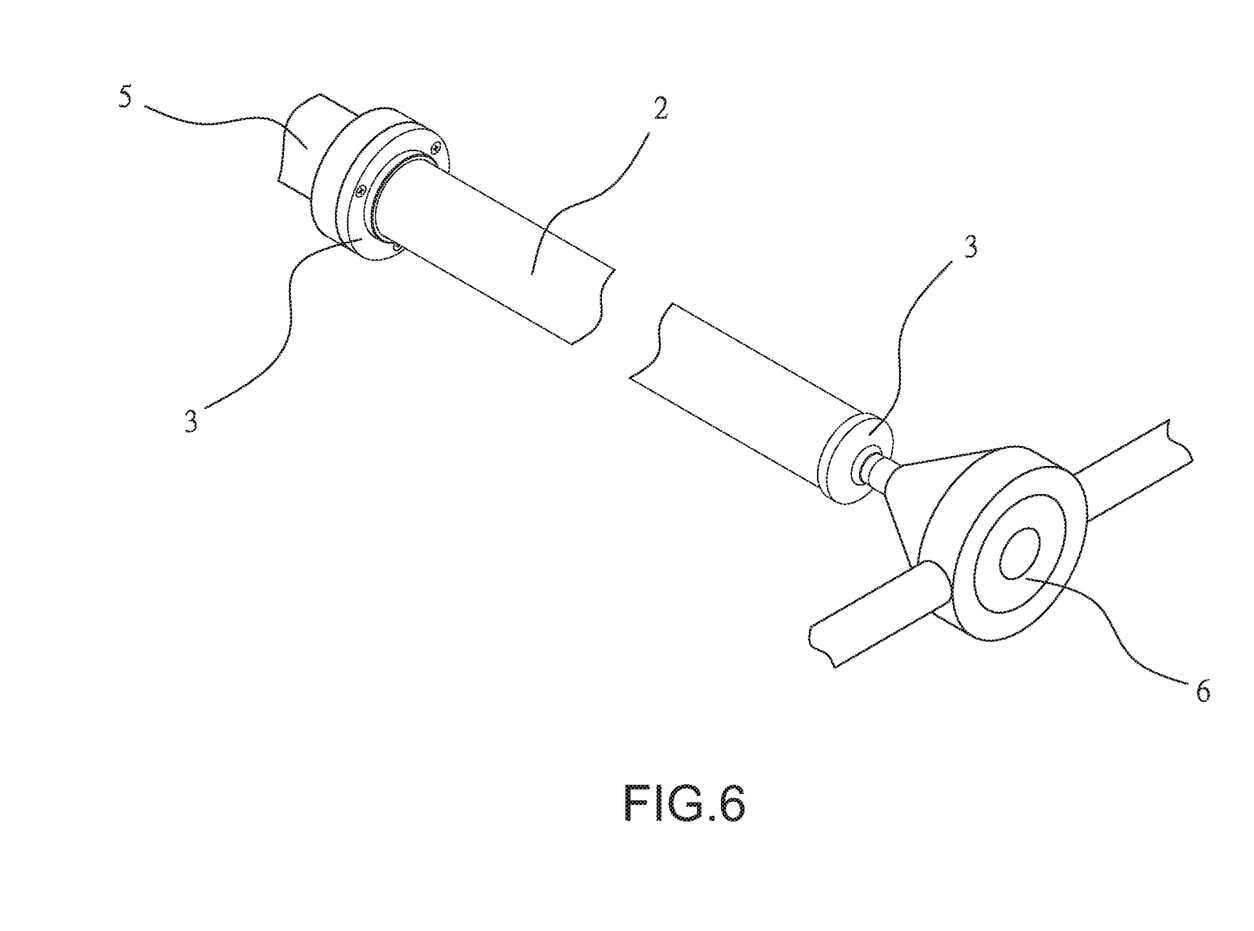
FIG. 6 shows that the transmission shaft assembly of the present invention is connected with a joint and a differential.

One of the two connectors 3 has multiple fixing holes 35 so as to be connected with a joint 5 as shown in FIG. 6 or a gear box. The other connector 3 has an axle 36 which is connected with a differential 6 as shown in FIG. 6. When the connectors 3 are connected to the first and second ends 21, 22 of the carbon-fiber tube 2, the first engaging portions 33 are engaged with the first and second recesses 212, 222, and the second engaging portions 34 are engaged with the first and second protrusions 211, 221 so as to achieve a reliable connection and to bear higher torque. The adhesive 4 is used between the connection grooves 321 of the inner tubular portions 32 and the carbon-fiber tube 2 to further fix the connectors 3 to the carbon-fiber tube 2. Therefore, the connectors 3 are not rotate or slip relative to the carbon-fiber tube 2 to bear higher torque and to reduce the transmission load, and to increase transmission efficiency. The present invention is tested to bear maximum torque up to 7500 N/M.

Figure 7:
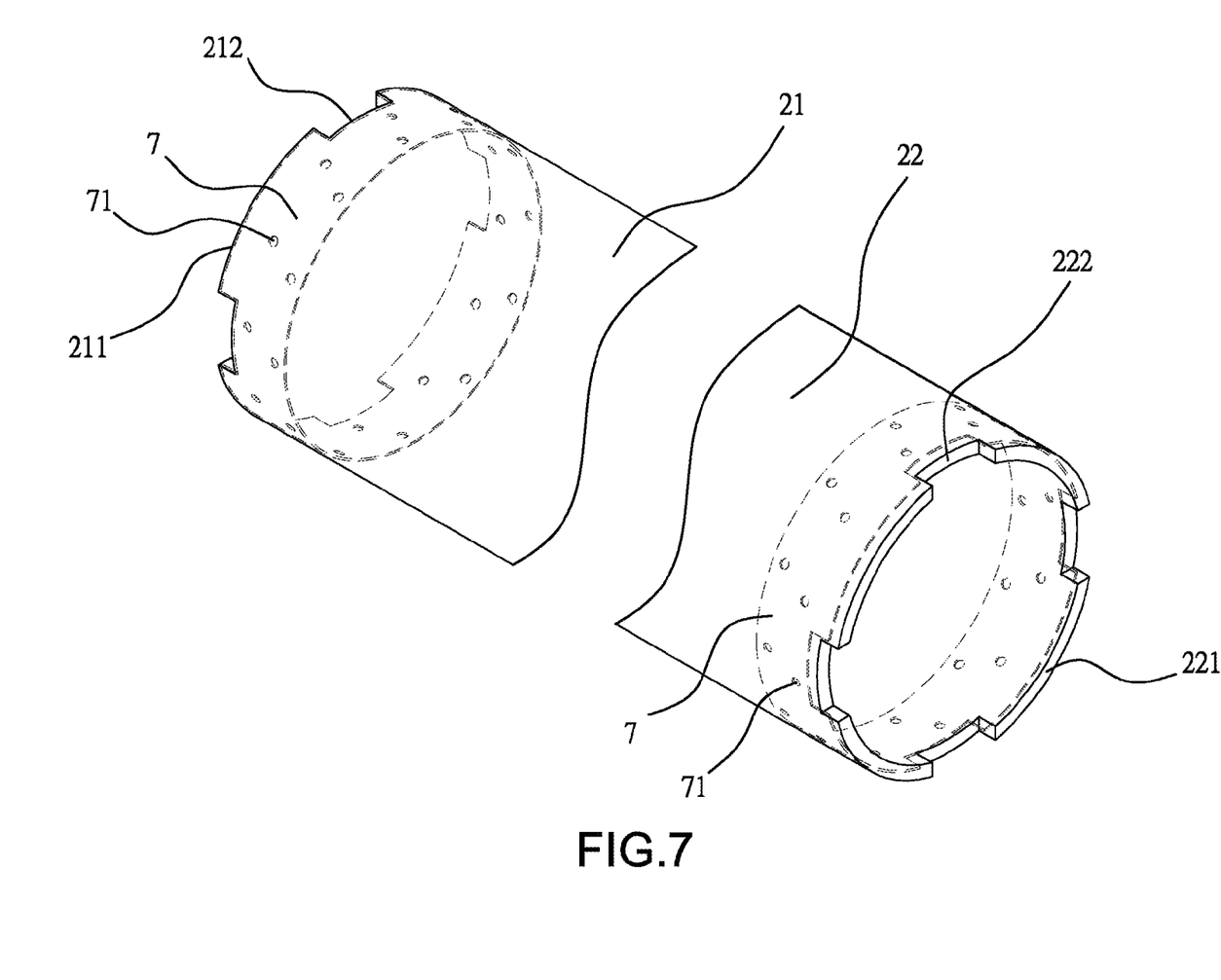
FIG. 7 shows metallic parts are respectively mounted to the two ends of the carbon-fiber tube of the transmission shaft assembly of the present invention.

As shown in FIG. 7, each of the first end 21 and the second end 22 of the carbon-fiber tube 2 is mounted by a metallic part 7. Each of the metallic parts 7 has apertures 71 defined therethrough, or does not have any aperture. The first protrusions 211 of the first end 21 and the second protrusions 221 of the second end 22 are reinforced by the metallic parts 7. An end of the metallic part 7 is in a same shape as a shape of the first protrusions 211 and first recesses 212 and the second protrusions 221 and second recesses 222.

While we have shown and described the embodiment in accordance with the present invention, it should be clear to those skilled in the art that further embodiments may be made without departing from the scope of the present invention.

What is claimed is:

1. A transmission shaft assembly comprising:
a carbon-fiber tube having a first end and a second end, the first end having first protrusions and first recesses which are located alternatively to the first protrusions, the second end having second protrusions and second recesses which are located alternatively to the second protrusions, wherein the carbon-fiber tube is an integral tube made by carbon-fiber compound material, each of the first end and the second end of the carbon-fiber tube is mounted by a metallic part when integrating, an end edge of the metallic part is in the same shape as the shape of the first protrusions and first recesses and the second protrusions and second recesses, each of the metallic parts has apertures defined therethrough; and
two connectors each having an outer tubular portion and an inner tubular portion extending axially therefrom, multiple first engaging portions and multiple second engaging portions located between the outer tubular portion and the inner tubular portion of each of the connectors, the first engaging portions located alternatively to the second engaging portions, the connectors connected to the first end and the second end of the carbon-fiber tube respectively, the first engaging portions of each of the two connectors engaged with the first/second recesses, the second engaging portions of each of the two connectors engaged with the first/second protrusions, the inner tubular portion of each of the two connectors inserted into the carbon-fiber tube and having connection grooves defined in an outer periphery thereof.

2. The transmission shaft assembly as claimed in claim 1, wherein each of the two connectors is made by metal, the outer tubular portion is integrally formed with the first engaging portions, the second engaging portions and the inner tubular portion for each of the two connectors, the first and second engaging portions are formed on an inner periphery of the outer tubular portion and located lower than a distal edge of the outer tubular portion, the first engaging portions are located between an inner end of each of the second engaging portions and the distal edge of the outer tubular portion.

* * * * *